United States Patent
Petniunas et al.

(10) Patent No.: US 6,405,575 B1
(45) Date of Patent: Jun. 18, 2002

(54) VIBRATION ABSORBING REED FORMING PROCESS

(75) Inventors: Alexander Petniunas, Dearborn; Dale Warren Converse, Livonia; Fang (Frank) Chen, Rochester Hills, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/681,905

(22) Filed: Jun. 22, 2001

(51) Int. Cl.[7] .......................... B21D 28/10; B27B 33/08
(52) U.S. Cl. .............................. 72/325; 76/112; 125/15
(58) Field of Search .......................... 72/325, 326, 324, 72/335; 76/112, 48; 125/15; 83/835, 845

(56) References Cited

U.S. PATENT DOCUMENTS

| | | | | |
|---|---|---|---|---|
| 733,967 A | * | 7/1903 | Hutchins | 72/326 |
| 1,535,777 A | * | 4/1925 | Hoxie | 72/326 |
| 3,111,977 A | * | 11/1963 | Kruger | 72/326 |
| 3,314,272 A | * | 4/1967 | Dahl | 72/325 |
| 4,686,752 A | * | 8/1987 | Sharples | 72/335 |
| 4,794,835 A | * | 1/1989 | Fujiyoshi | 83/835 |
| 5,012,972 A | * | 5/1991 | Kawata | 125/15 |

FOREIGN PATENT DOCUMENTS

| | | | | |
|---|---|---|---|---|
| FR | 468049 | * | 4/1915 | 83/835 |
| JP | 4-53701 | * | 2/1992 | 83/835 |
| SU | 673451 | * | 7/1979 | 82/835 |
| WO | WO 93/08969 | * | 5/1993 | 83/835 |

* cited by examiner

*Primary Examiner*—Daniel C. Crane
(74) *Attorney, Agent, or Firm*—Gigett Bejin

(57) ABSTRACT

A vibration absorbing reed forming process for a piece of sheet metal having a planar surface comprising the steps of cutting a predetermined number of tabs in the piece of sheet metal with a first stamp, aligning the tabs in coplanar fashion with the planar surface with a second stamp, and forming a rib in the tabs by drawing the metal toward the centers of the tabs a predetermined distance thereby creating a gap between the tabs and the piece of sheet metal.

10 Claims, 2 Drawing Sheets

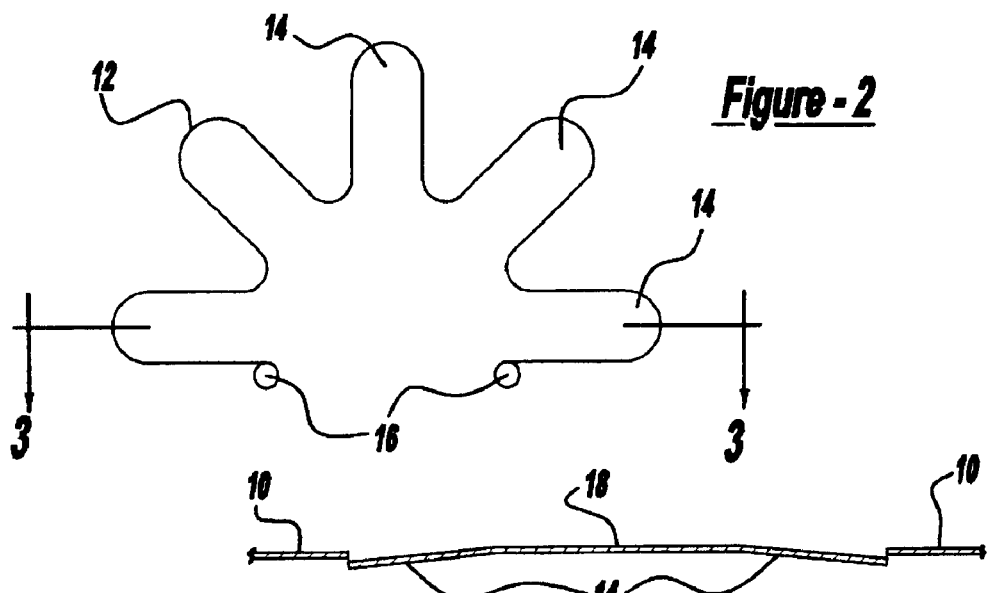
*Figure - 2*
*Figure - 3*
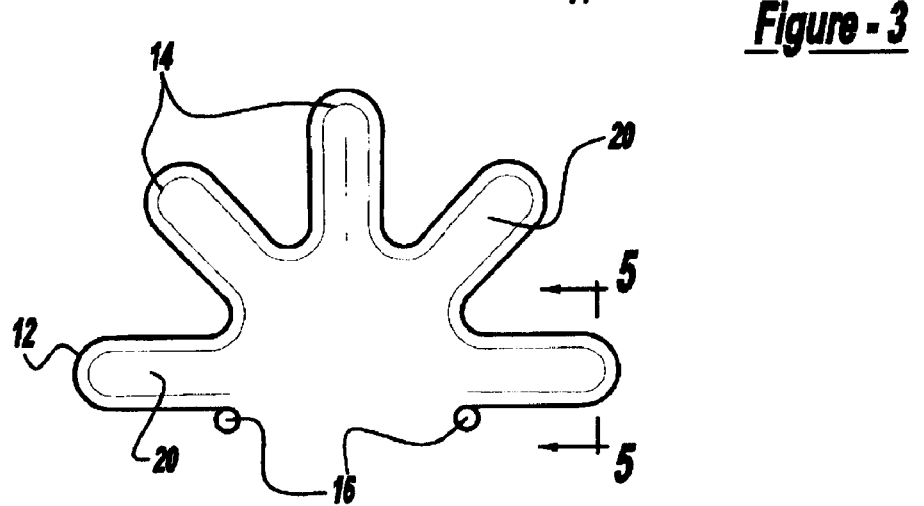
*Figure - 4*
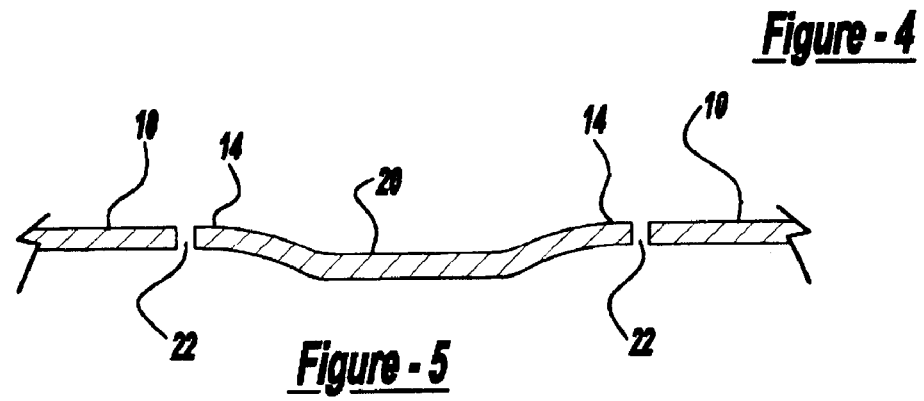
*Figure - 5*

VIBRATION ABSORBING REED FORMING PROCESS

BACKGROUND OF INVENTION

The present invention relates to a vibration absorbing reed forming process and, more specifically, to a sheet metal stamping reed forming process.

In the past, saw blades had a tendency to produce excessive noise and vibration when in use. As a result, typical saw blades now employ wave guide damping technology, which allows the saw blade to produce less noise and vibration when in use. This wave guide damping technology is accomplished by employing a series of reeds, which are partially filled with a damping material such as rubber or the like. Damping, or noise and vibration absorption, is obtained when the damping material experiences a shearing action, or oscillatory reed movement perpendicular to the cutting plane of the saw.

Reeds are not only used in saw blades, but in other sheet metal applications as well. Reeds are formed by narrow cuts in the piece of sheet metal of a particular design or pattern. Conventionally, these narrow cuts are produced by utilizing a laser. There are a variety of reed designs formed from these cuts, each with different resulting damping characteristics. The gaps formed by the laser cuts are then partially filled with damping material to perform the desired damping function. Damping efficiency is proportional to the width of the laser cut and dependent on the placement and design of the reeds. For example, the narrower the cut, the greater the shearing action of the damping material, and thus the greater the damping efficiency. However, since the reeds are cut by laser, the reed forming process is time consuming and is not suitable for low cost, high production volume sheet metal applications.

Therefore, it would be beneficial to have a reed forming process that is more cost-effective and less time consuming than the laser cut reed forming process, while still allowing for specific reed design and high damping efficiency.

SUMMARY OF THE INVENTION

It is an object of the present invention to provide a vibration absorbing reed forming process that overcomes the disadvantages of the prior art.

It is a feature of the present invention that a vibration absorbing reed forming process utilizes a succession of stamping operations that is more cost-effective and less time consuming than previous reed forming methods while still providing desired damping efficiency.

The present invention advantageously provides a vibration absorbing reed forming process for a piece of sheet metal having a planar surface comprising the steps of cutting a predetermined number tabs in the piece of sheet metal with a first stamp, aligning the tabs in coplanar fashion with the planar surface with a second stamp, and forming a rib in the tabs by drawing the metal toward the centers of the tabs a predetermined distance thereby creating a gap between the tabs and the piece of sheet metal.

BRIEF DESCRIPTION OF THE DRAWINGS

These and other objects, features, and advantages of the present invention will become apparent from a reading of the following detailed description with reference to the accompanying drawings, in which:

FIG. 2 is a top view of a reed design according to the present invention;

FIG. 3 is a cross-sectional view taken along line 3—3 in FIG. 2 of a first stamp cut according to the present invention;

FIG. 4 is a top view of a reed design showing rib location according to the present invention; and FIG. 5 is a cross-sectional view taken along line 5—5 in FIG. 4 of the rib formed by a second stamp according to the present invention.

DETAILED DESCRIPTION

Figure 1:
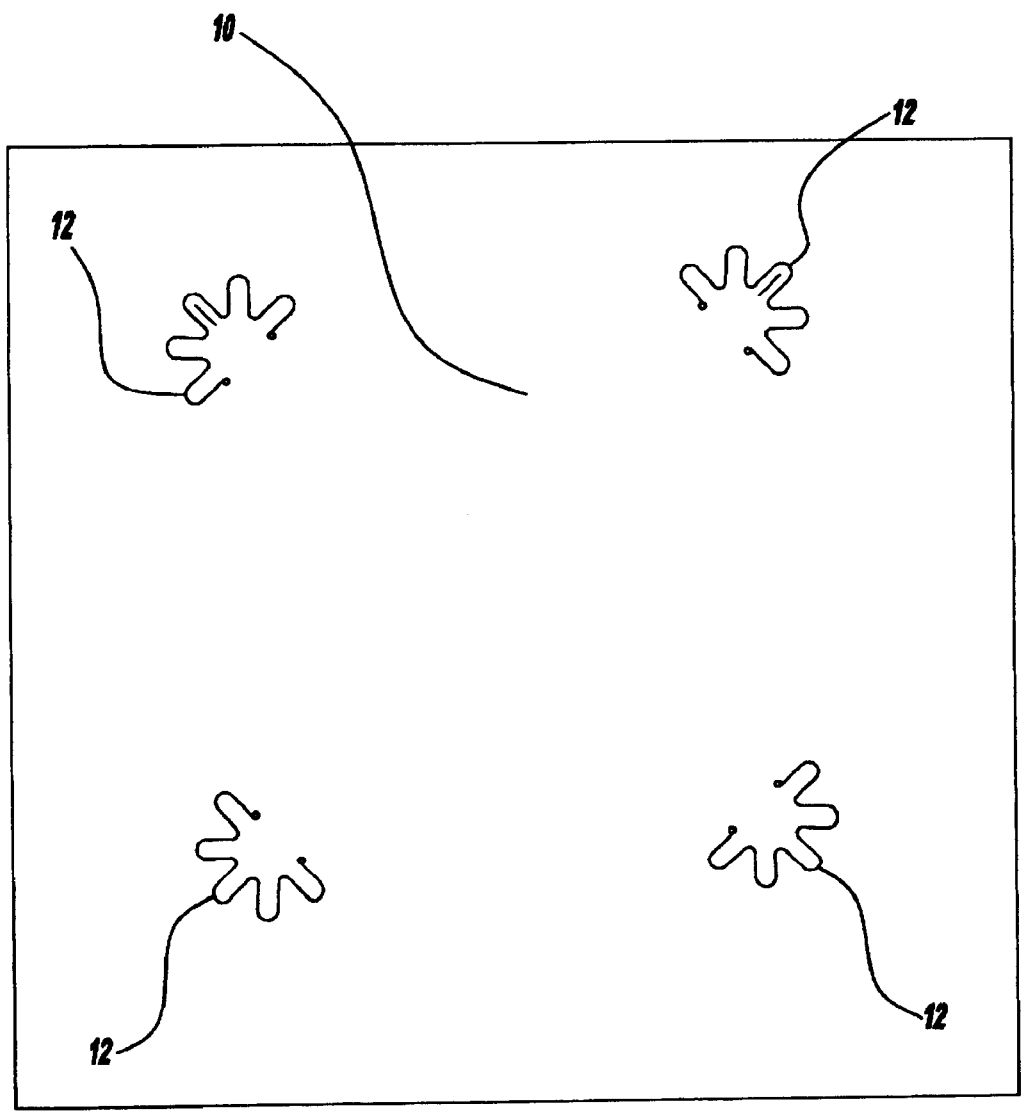
FIG. 1 is a top view of a set of vibration absorbing reeds according to the present invention.

FIG. 1 shows a piece of sheet metal 10 having a series of reeds 12. Seen here, there are a predetermined number of reeds 12 spaced a predetermined distance apart. As also shown, the reeds 12 have a specific design, or pattern. The specific design of the reeds 12 is to ensure desired wave guide damping efficiency.

FIG. 2 shows a closer look at the specific design of the reed 12 formed from a first stamp in the reed 12 forming process. As seen here, the reed 12 design forms a predetermined number of tabs 14 extending outward a predetermined distance in a finger-like fashion. There are circular cutout portions 16, which begin a first tab 14 and end a last tab 14, thus forming the design of the reed 12. The first stamp cuts this reed 12 design in the piece of sheet metal 10 to form the tabs 14, which alternately protrude up and down from the cutting plane of the piece of sheet metal 10 as shown in FIG. 3.

FIG. 3 is a cross-section of the piece of sheet metal 10 along line 3—3 in FIG. 2 after the first stamp. Here, the piece of sheet metal 10, the end tabs 14, and a center portion 18 of the reed 12 is shown. The piece of sheet metal 10 and center portion 18 of the reed 12 are flush, or coplanar, while the end tabs 14 angle downward, or away from the planar surface of the piece of sheet metal 10, a predetermined degree as a result of the first stamp.

FIGS. 4 and 5 show the reed 12 design as seen in FIG. 2, but further show a rib 20 that is formed from a second stamp in the reed 12 forming process. The rib 20 is formed a predetermined distance inside and along the entire reed 12 design. In the second stamp of the reed 12 forming process, the rib 20 is formed simultaneously as the tabs 14 are brought back into alignment with the planar surface of the piece of sheet metal 10. In forming the rib 20, the metal is drawn towards the centers of the tabs 14, thereby creating narrow gaps 22, from where the cut of the first stamp was made, to later be filled with damping material as is known in the art.

In FIG. 5, the rib 20 can be seen in cross-section taken along line 5—5 in FIG. 4. As seen from this view, the rib 20 extends downward a predetermined distance from the planar surface of the piece of sheet metal 10, thus drawing the metal inward toward the center of the tab 14. As a result, narrow gaps 22 are formed along the entire reed 12 design. The gaps 22 are then filled with a damping material, thereby completing the reed 12 forming process. This invention advantageously provides a vibration absorbing reed 12 forming process that is more cost-effective and less time consuming than previous methods.

While only one embodiment of the vibration absorbing reed forming process of the present invention has been described, others may be possible without departing from the scope of the following claims.

What is claimed is:

1. A vibration absorbing reed forming process for a piece of sheet metal having a planar surface comprising the steps of:

cutting a predetermined number of tabs in the piece of sheet metal with a first stamp to place the tabs out of the plane of the planar surface;

aligning the tabs in the plane of the planar surface with a second stamp; and forming a rib in the tabs by drawing the metal toward the centers of the tabs a predetermined distance thereby creating a gap between the tabs and the piece of sheet metal while maintaining a tab edge at the gap in the plane of the planar surface.

2. The vibration absorbing reed forming process as defined in claim 1, further including the step of bringing the tabs alternately up and down a predetermined degree from the planar surface with the first stamp.

3. The vibration absorbing reed forming process as defined in claim 1, wherein the steps of aligning the tabs and forming the rib occurs simultaneously with the second stamp.

4. The vibration absorbing reed forming process as defined in claim 1, wherein the gap has a predetermined width adapted to be filled with a damping material.

5. A vibration absorbing reed forming process for a piece of sheet metal having a planer surface comprising the steps of:

cutting a predetermined number of tabs in the piece of sheet metal with a first stamp to place the tabs out of the plane of the planar surface;

bringing the tabs alternately up and down a predetermined degree from the planar surface;

aligning the tabs in the plane of the planar surface with a second stamp; and forming a rib in the tabs by drawing the metal toward the centers of the tabs a predetermined distance thereby creating a gap between the tabs and the piece of sheet metal while maintaining a tab edge at the gap in the plane of the planar surface.

6. The vibration absorbing reed forming process as defined in claim 5, wherein the steps of cutting the tabs and bringing the tabs alternately up and down a predetermined degree occurs simultaneously with the first stamp.

7. The vibration absorbing reed forming process as defined in claim 5, wherein the steps of aligning the tabs and forming the rib occurs simultaneously with the second stamp.

8. The vibration absorbing reed forming process as defined in claim 5, wherein the gap has a predetermined width adapted to be filled with a damping material.

9. A vibration absorbing reed forming process for a piece of sheet metal having a planer surface comprising the steps of:

cutting a predetermined number of tabs in the piece of sheet metal with a first stamp to place the tabs out of the plane of the planar surface;

bringing the tabs alternately up and down a predetermined degree from the planar surface with the first stamp;

aligning the tabs in the plane of the planar surface with a second stamp; and forming a rib in the tabs by drawing the metal toward the centers of the tabs a predetermined distance thereby creating a gap between the tabs and the piece of sheet metal while maintaining a tab edge at the gap in the plane of the planar surface.

10. The vibration absorbing reed forming process as defined in claim 9, wherein the gap has a predetermined width adapted to be filled with a damping material.

\* \* \* \* \*